United States Patent [19]

Noguchi et al.

[11] 4,254,745
[45] Mar. 10, 1981

[54] TWO-STROKE CYCLE GASOLINE ENGINE

[75] Inventors: Masaaki Noguchi, Nagoya; Yukiyasu Tanaka; Isao Igarashi, both of Okazaki, all of Japan

[73] Assignee: Toyota Jidosha Kogyo Kabushiki Kaisha, Toyota, Japan

[21] Appl. No.: 62,808

[22] Filed: Aug. 1, 1979

[30] Foreign Application Priority Data

Sep. 25, 1978 [JP] Japan .................... 53-117588

[51] Int. Cl.³ ............................. F02B 25/08
[52] U.S. Cl. ........................ 123/51 B; 123/51 BA; 123/59 B; 123/336; 123/319
[58] Field of Search ........... 123/51 B, 51 BA, 51 BB, 123/51 BD, 51 R, 59 B, 336, 319

[56] References Cited

U.S. PATENT DOCUMENTS

| | | | |
|---|---|---|---|
| 2,090,709 | 8/1937 | Steiner | 123/51 B |
| 2,267,437 | 12/1941 | Alfaro | 123/51 B |
| 2,435,233 | 2/1948 | Mueller, Jr. et al. | 123/51 B |

FOREIGN PATENT DOCUMENTS

| | | | |
|---|---|---|---|
| 2844308 | 10/1979 | Fed. Rep. of Germany | 123/51 BA |
| 245802 | 3/1926 | France | 123/51 B |
| 406451 | 11/1943 | Italy | 123/51 B |
| 409812 | 3/1945 | Italy | 123/51 B |

*Primary Examiner*—Wendell E. Burns
*Attorney, Agent, or Firm*—Finnegan, Henderson, Farabow, Garrett & Dunner

[57] ABSTRACT

A two-stroke cycle gasoline engine including at least one two-stroke cycle power cylinder—piston assembly having two horizontally opposed pistons and incorporating uniflow scavenging, a reciprocating type scavenging pump means including at least one pump cylinder—piston assembly of the reciprocating type driven by the power cylinder—piston assembly in synchronization therewith, wherein the carburetor incorporates, in addition to a normal throttle valve, a control valve which automatically increases its opening as the rotational speed of the engine increases, so that, when it is set to provide its maximum opening at the maximum rotational speed of the engine, it provides gradually reduced opening as the rotational speed of the engine lowers.

5 Claims, 16 Drawing Figures

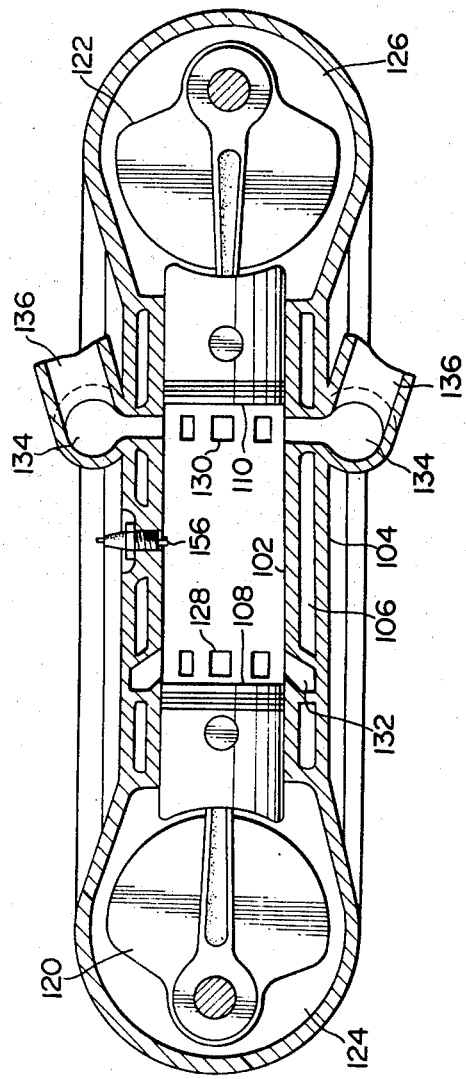
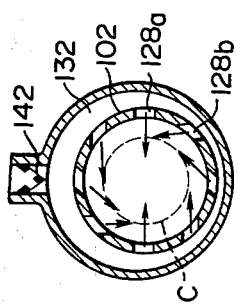
FIG. 3
FIG. 4

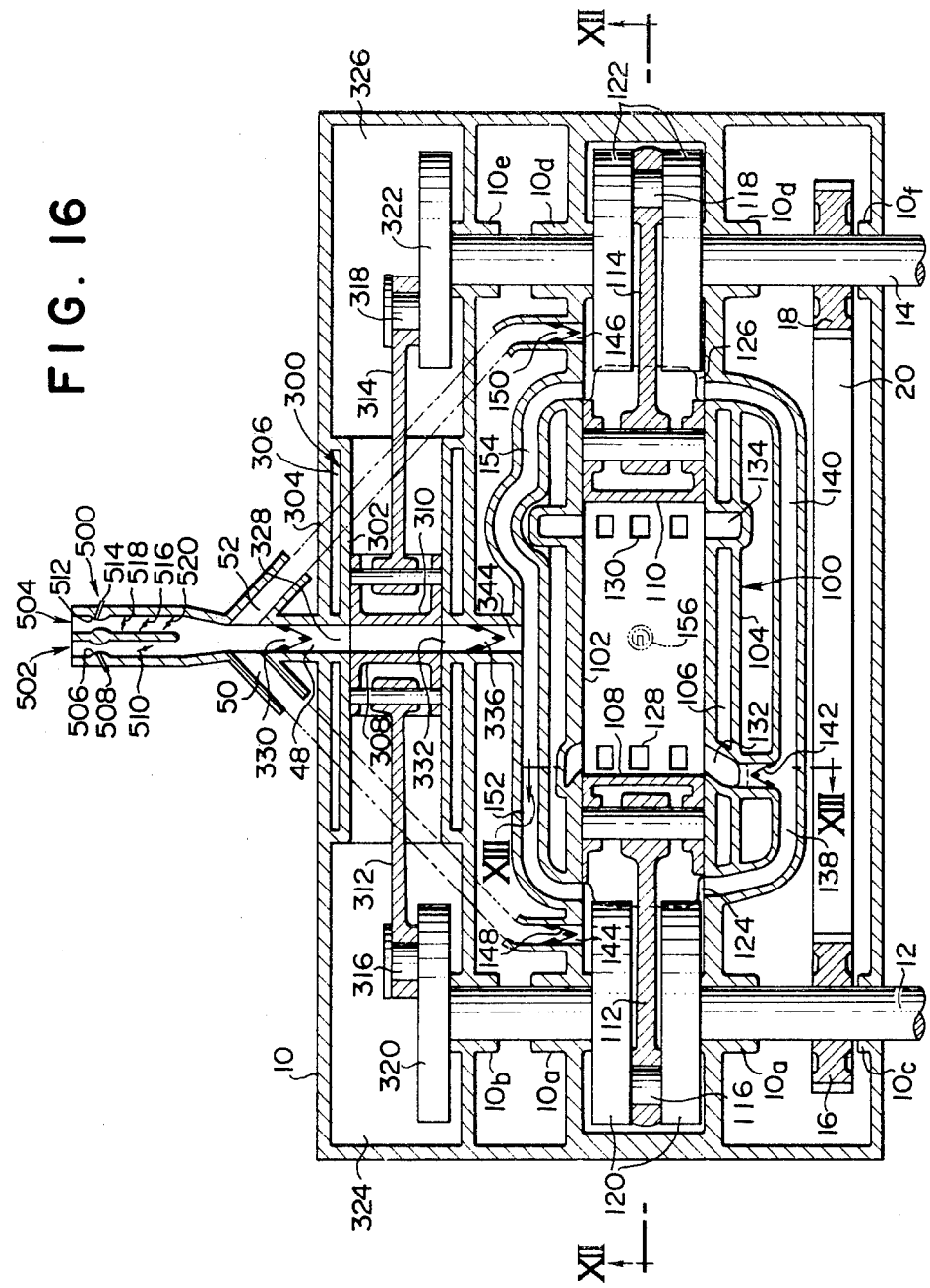

TWO-STROKE CYCLE GASOLINE ENGINE

BACKGROUND OF THE INVENTION

The present invention relates to a two-stroke cycle gasoline engine, and, more particularly, to a two-stroke cycle gasoline engine adapted for use with automobiles.

A two-stroke cycle engine has theoretically the advantage that an engine of a certain size can generate a greater power than a four-stroke cycle engine of a bigger size because the two-stroke cycle engine has twice as many work cycles per revolution as the four stroke cycle engine. In fact, however, a conventional two-stroke cycle gasoline engine employing a carburetor has drawbacks, such as: that it has high fuel consumption as compared with a four stroke cycle engine due to the loss of fuel-air mixture caused by the direct escape, i.e. blow-out, of scavenging mixture to the exhaust manifold during scavenging; and that it cannot generate such a high power as expected from the fact that it has twice as many work strokes as the corresponding four-stroke cycle engine, due to the fact that the scavenging is still insufficient.

As methods of scavenging in two-stroke cycle engines are conventionally known cross scavenging, loop scavenging, and uniflow scavenging. In this connection, if the amount of scavenging mixture is increased so as to improve scavenging efficiency, uniflow scavenging is considered to be most desirable, in order to obtain the highest scavenging efficiency without causing direct escape of the scavenging mixture to the exhaust manifold. In view of this, and in view of the aforementioned drawbacks, the actual application of two-stroke cycle gasoline engines has been conventionally limited to the field of small-size engines in which simplicity of structure and low manufacturing cost are essential conditions. Therefore, conventional two-stroke cycle gasoline engines presently used generally employ crankcase compression for scavenging. However, scavenging by crankcase compression cannot deliver a sufficient amount of scavenging mixture, thereby causing incomplete scavenging, which leads to a relatively low volumetric efficiency.

In view of the fact that such a low volumetric efficiency is the principal cause of the poor output power of conventional two-stroke cycle gasoline engines, in a preceding patent application Ser. No. 917,244 we have proposed a two-stroke cycle gasoline engine particularly suitable for use as an automobile engine, which comprises at least one two-stroke cycle power cylinder—piston assembly incorporating uniflow scavenging and two horizontally opposed pistons, and at least one scavenging pump cylinder—piston assembly of the reciprocating type, with or without incorporating crankcase compression, wherein the total stroke volume of the scavenging pump means is 1.35 to 1.85 times as large as that of the power cylinder—piston assembly, so that the volumetric efficiency is substantially increased so as to generate high power output when compared with conventional two-stroke cycle gasoline engines.

Furthermore, in view of the fact that, even when a separate pump cylinder—piston assembly is employed as proposed in the abovementioned former application, if the conventional crankcase compression is also incorporated, the operational phase relation between the power cylinder—piston assembly and the scavenging pump means is substantially restricted, we have proposed, in our former application Ser. No. 917,241, not to utilize at all crankcase compression, and to provide a two-stroke cycle gasoline engine which comprises at least one two-stroke cycle power cylinder—piston assembly of the reciprocating type and driven by said power cylinder—piston assembly in synchronization therewith with a phase difference therebetween, wherein the total stroke volume of said pump cylinder—piston assembly is between 1.15 and 1.65 times as large as that of said power cylinder—piston assembly, and said phase difference between said power and said pump cylinder—piston assemblies is so determined that the top dead center of a pump cylinder—piston assembly is, as viewed in the crank angle diagram, in a range between 15° in advance of and 15° behind the midpoint between the bottom dead center and the scavenging port closing phase point of the power cylinder—piston assembly to which it supplies scavenging mixture, thereby substantially improving its scavenging efficiency when compared with conventional two-stroke cycle gasoline engines, so that the engine can generate high output power and is suitable for use as an automobile engine.

In either of the abovementioned formerly proposed two-stroke cycle gasoline engines, in order to improve scavenging efficiency, the amount of scavenging mixture is increased by employing an additional or separate pump when compared with the conventional scavenging dependent only upon crankcase compression, so that the volumetric efficiency of the power cylinder becomes as high as 75%–100%. In this connection, in the case of a power cylinder—piston assembly having two horizontally opposed pistons and incorporating uniflow scavenging, when the path of the flow of scavenging mixture from the scavenging port to the exhaust port, and its length, which are determined by the geometry of the power cylinder and the scavenging and exhaust ports provided at its scavenging and exhaust sides, respectively, and the manner of flow of the scavenging mixture in the power cylinder which is ejected into the power cylinder through the scavenging ports and generally flows along a helical path, are given, the speed of scavenging, i.e. the speed at which the scavenging mixture moves from the scavenging port to the exhaust port while urging the exhaust gases remaining in the power cylinder, is determined by the difference between the pressure of the scavenging mixture and that of the remaining exhaust gases, and by the amount of scavenging mixture which backs up the scavenging mixture introduced into the power cylinder, i.e. by the total amount of scavenging mixture, and has no direct relation to the rotational speed of the engine. On the other hand, however, the time which lapses from the time point when the scavenging port is opened to the time point when the exhaust port is closed becomes shorter as the rotational speed of the engine becomes higher. Therefore, when so-called engine matching is so performed that, when the engine is operating at that load and rotational speed which are most frequently employed, the exhaust port is closed when the scavenging mixture has just pushed the exhaust gases out of the exhaust port (such a rotational speed is called "matching rotational speed"), assuming that the volumetric efficiency of the scavenging pump is constant regardless of the rotational speed of the engine, blowing-through of scavenging mixture will occur when the engine is operating at a rotational speed lower than the matching rotational speed, while exhaust gases will remain in the power cylinder when the engine is operating at a rotational speed higher than the matching rotational speed.

The volumetric efficiency of a reciprocating piston type scavenging pump means such as crankcase compression and a reciprocating type pump cylinder—piston assembly is generally higher as its rotational speed is lower; that is, when the pump means is directly driven by an engine, as the rotational speed of the engine is lower. Actually, however, an intake system which includes a carburetor connected to a scavenging pump means, an intake passage, and other flow resistant means such as reed valves incorporated in the intake passage, is subject to a pulsating effect; and, since such a pulsating effect changes in accordance with engine rotational speed, the volumetric efficiency of the scavenging pump means does not necessarily increase in accordance with decrease in engine rotational speed. Generally, in fact, the volumetric efficiency of a scavenging pump means is better when engine rotational speed is not very low but is relatively high. Further, when a larger number of pump cylinder—piston assemblies are operated with phase differences therebetween, the maximum volumetric efficiency is obtained at a higher rotational speed of the engine.

Generally, when an intake system operates with a single barrel type carburetor, the intake volumetric efficiency of a scavenging pump served by this caburetor changes in accordance with an upwardly convex curve as shown in FIG. 1, wherein the efficiency first increases in accordance with increase of engine rotational speed so as to reach the maximum value at a certain engine rotational speed, and then lowers when engine rotational speed further increases, provided that the venturi diameter is constant and the throttle opening is constant, as, for example, when the throttle is set at full throttle. In this case, the point of maximum volumetric efficiency shifts in the direction of high rotational speed as the venturi diameter is increased. However, increase of the venturi diameter means reduction of the speed of air flowing through the venturi, and causes poor atomization of gasoline in low load operation of the engine, thereby reducing engine torque, increasing fuel consumption, and reducing accelerating performance. Further, when the scavenging pump includes a plurality of chambers, the poor atomization of gasoline also causes poor distribution of fuel between these pump chambers and the power cylinders separately connected to these pump chambers. Therefore, when an engine is equipped with an intake system having a single barrel type carburetor and a venturi of a certain diameter so that the maximum intake volumetric efficiency of a scavenging pump driven by the engine is obtained at a medium point in the range of engine rotational speed, a difficulty is encountered with regard to matching of the power cylinder for scavenging. That is, if the power cylinder is matched for scavenging at an engine rotational speed which provides the maximum intake volumetric efficiency of the pump, as the rotational speed of the engine increases beyond this matching rotational speed, the scavenging becomes more and more incomplete. However, if the power cylinder is matched for scavenging at a high engine rotational speed, as the rotational speed of the engine lowers, more blowing through of scavenging mixture will occur.

On the other hand, in order to obtain good atomization of fuel over a wide range of engine rotational speed, it is already known to employ a two stage two barrel type carburetor which is opened or closed in two stages in accordance with engine load in such a manner that, when engine load is relatively low, intake air is drawn only through its first stage barrel, and when engine load increases its second stage barrel is also opened so that air is drawn through both the first and second stage barrels. In these conventional two stage two barrel type carburetors the first and second stage barrels generally incorporate first and second throttle valves, respectively, of which the first throttle valve which controls opening of the first stage barrel is directly operated by an accelerating mechanism including an accelerator pedal, while the second throttle valve which controls opening of the second stage barrel is interconnected with the first throttle valve by a link mechanism so that the second throttle valve is opened when the first throttle valve is opened beyond a predetermined opening, or alternatively the second throttle valve is opened by a diaphragm means which is operated by the venturi vacuum in the first stage barrel so that the second throttle valve is opened when the venturi vacuum in the first stage barrel increases beyond a predetermined value due to increase of air flow speed in the first stage barrel over a predetermined value. When scavenging mixture is supplied to a scavenging pump by employing this conventional two stage two barrel type carburetor, it is possible to set the engine rotational speed at which the intake volumetric efficiency of the pump becomes maximum at a point of high engine rotational speed, as shown by a broken line in FIG. 1, without deteriorating atomization of fuel in low speed operation of the engine, so that the matching of the power cylinder for scavenging is accomplished more desirably. However, the change of pump intake volumetric efficiency relative to engine rotational speed obtained by the conventional two stage two barrel type carburetor is still relatively moderate as seen in FIG. 1, and in this case, if the power cylinder is matched for scavenging at its maximum rotational speed, in low load operation considerable blowing-through of scavenging mixture still occurs.

SUMMARY OF THE INVENTION

A low intake volumetric efficiency of a scavenging pump means that the ratio of the delivery amount to the stroke volume of the pump is low, and that therefore a pump having a larger stroke volume is required to obtain a predetermined delivery amount. However, from the viewpoint of energy economy, the loss of energy which increases in accordance with lowering of of the intake volumetric efficiency of the pump corresponds to the increase of the loss of power in driving the pump, and this is smaller than the loss of energy caused by the fuel being blown out from the power cylinder without being combusted due to poor matching of the power cylinder for scavenging. In the conventional two-stroke cycle gasoline engines which depend upon only crankcase compression for the compression of scavenging mixture, a reduction in the intake volumetric efficiency of a scavenging pump directly causes a reduction in the output power of the engine, and therefore the intake volumetric efficiency of a scavenging pump seriously affects the performance of the engine. However, the engine in which the present invention is incorporated is of the type which incorporates a reciprocating type pump cylinder—piston assembly driven by a power cylinder—piston assembly in synchronization therewith, regardless of whether or not the crankcase compression of the power cylinder is utilized for compressing scavenging mixture, so as to increase the total stroke volume of the scavenging pump to be larger than the total stroke volume of the power cylinder—piston assembly, and in this case, therefore, a reduction in the intake volumetric efficiency of the scavenging pump can be easily compensated for by slightly increasing the total stroke volume of the separate or independent pump cylinder—piston assembly. In this case, by changing the intake volumetric efficiency of the scavenging pump more greatly relative to engine rotational speed than in the case of employing a conventional two stage two barrel type carburetor, it is possible to operate an engine which was matched for scavenging at its maximum rotational speed in its low rotational speed operational region in well matched condition, wherein no blowing out of scavenging mixture occurs.

It is therefore the object of the present invention to improve the engines proposed in the aforementioned prior applications, which are of the type comprising at least one two-stroke cycle power cylinder—piston assembly having two horizontally opposed pistons and incorporating uniflow scavenging, and a reciprocating type scavenging pump means including at least one pump cylinder—piston assembly of the reciprocating type driven by said power cylinder—piston assembly in synchronization therewith, so as to be able to maintain the most desirable matching of the engine for scavenging over the entire rotational speed of the engine.

In accordance with the present invention, the abovementioned object is accomplished by incorporating, in a two-stroke cycle gasoline engine of the aforementioned type, a carburetor which includes a throttle valve and a control valve which is controlled to increase its opening as the rotational speed of the engine increases.

By a carburetor being equipped with a control valve adapted to increase its opening as the rotational speed of the engine increases, in addition to a normal throttle valve adapted to be operated by the driver, the flow resistance of the carburetor can be more greatly changed in accordance with change of engine rotational speed, so that the intake volumetric efficiency of a scavenging pump which receives supply of fuel-air mixture from the carburetor can be more greatly changed in accordance with change of engine rotational speed, i.e. the ratio of the reduction of the intake volumetric efficiency of a scavenging pump relative to the lowering of engine rotational speed from its maximum value can be determined to be greater than in the case where the conventional two stage two barrel type carburetor is employed, and therefore it is possible to operate an engine which is matched for scavenging at its maximum rotational speed in its low speed operational region while maintaining the desirable matching condition for scavenging, thereby avoiding blowing-out of scavenging mixture in low speed operation of the engine, thus maintaining high fuel consumption over the entire rotational speed range of the engine.

In this connection, the maximum rotational speed of the engine according to the present invention is about 3800 rpm at the highest. This limitation is imposed in order to utilize the feature that the two-stroke cycle engine has twice as many working strokes as the four cycle engine to its extremity by increasing the volumetric efficiency of the power cylinder, thereby making it possible to operate the engine at lower rotational speed, so as to reduce frictional loss caused by high speed rotation, and to increase effective output power per unit stroke volume of the power cylinder. These matters have already been explained in the specifications of the aforementioned prior applications Ser. Nos. 917,244 and 917,241.

In accordance with a particular feature of the present invention, the abovementioned carburetor may be constructed as a two stage two barrel carburetor having first and second barrels and adapted to be opened and closed in two stages in accordance with engine load, wherein the aforementioned control valve is incorporated in the second stage barrel which is opened in high load operation of the engine.

BRIEF DESCRIPTION OF THE DRAWINGS

The present invention will become more fully understood from the detailed description given hereinbelow and the accompanying drawings, which are given by wasy of illustration only, and are thus not limitative of the present invention, and wherein:

FIGS. 3 and 4 are sectional views along lines III—III and IV—IV in FIG. 2;

FIG. 16 is a diagrammatical plan sectional view showing a third embodiment of the two-stroke cycle gasoline engine of the present invention.

DESCRIPTION OF THE PREFERRED EMBODIMENTS

Figure 2:
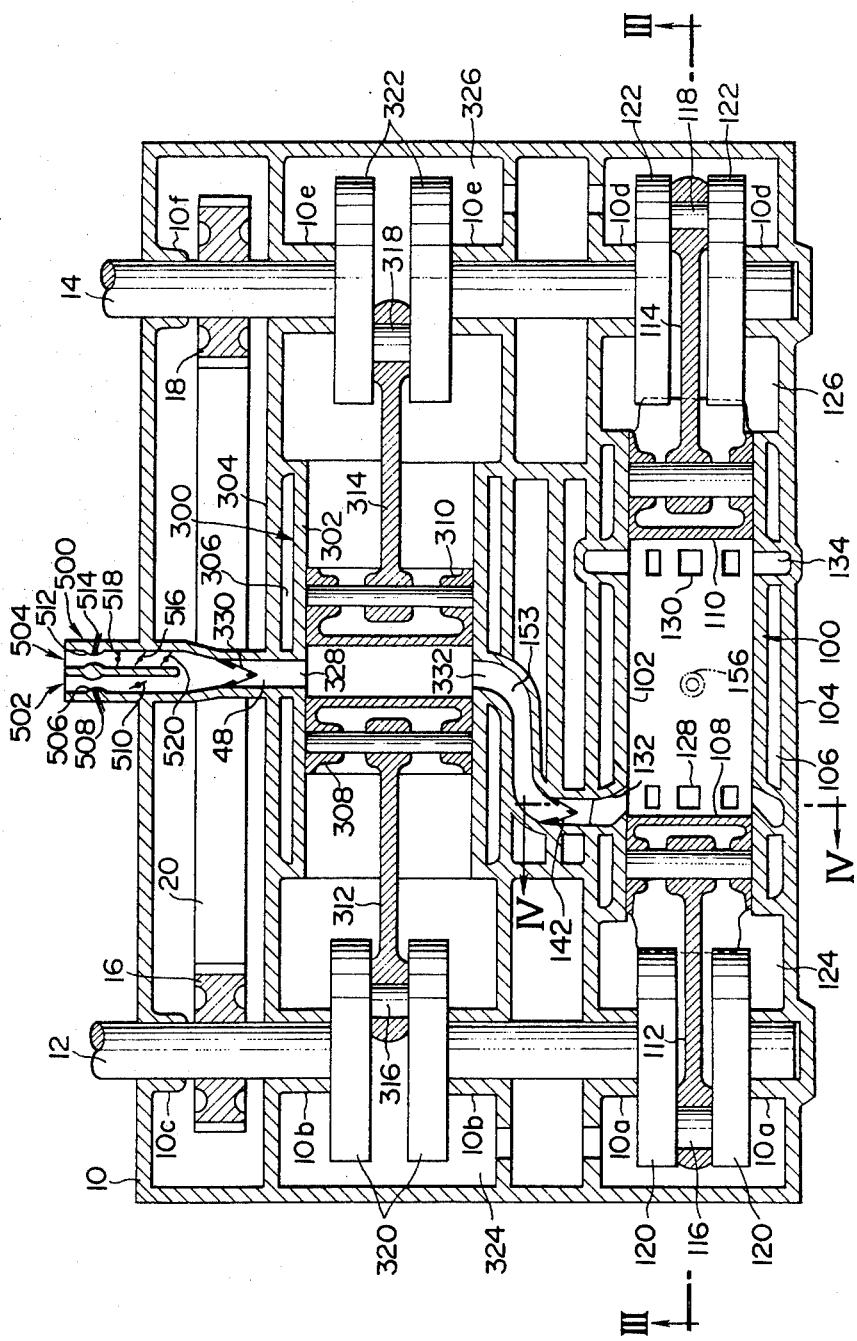
FIG. 2 is a diagrammatical plan sectional view showing a first embodiment of the two-stroke cycle gasoline engine of the present invention.

Referring to FIGS. 2-4, showing the first embodiment of the present invention, the two-stroke cycle gasoline engine herein shown comprises a cylinder block 10, the overall shape of which is like a relatively flat block rectangular in a plan view, and which is adapted to be installed substantially with the two largest of its six faces arranged horizontally. In the cylinder block there are provided a pair of crankshafts 12 and 14 which are arranged along opposite edges of the cylinder block and are rotatably supported by bearings 10a–10c and 10d–10f, respectively. In this embodiment, for example, the crankshaft 12 may be connected to auxiliaries of the engine while the crankshaft 14 may serve as the power output shaft of the engine. In the cylinder block 10 there are incorporated a power cylinder—piston assembly 100 and an independent reciprocating type scavenging pump 300, which is in this embodiment a pump cylinder—piston assembly having horizontally opposed pistons.

First, the power cylinder—piston assembly 100 will be described. The assembly includes a power cylinder 102 supported by the cylinder block 10. The power cylinder is surrounded by a cooling jacket 106 defined by a jacket wall 104. In the cylinder 102 are arranged two power pistons 108 and 110, one being located on the scavenging side or the left side in the figure, while the other is located on the exhaust side or the right side in the figure, respectively. The pistons 108 and 110 are individually connected with connecting rods 112 and 114, which in turn are individually connected with crankpins 116 and 118. The crankpins 116 and 118 are individually supported by crank arms 120 and 122. The two crank mechanisms each including a crank arm and a crank pin are individually housed in crankcases 124 and 126. Since in this case no crankcase compression is involved, the crankcases may have any clearance volume.

The cylinder 102 has a plurality of scavenging ports 128 and a plurality of exhaust ports 130. These scavenging ports and exhaust ports are connected with a scavenging plenum 132 and an exhaust plenum 134, respectively. The exhaust plenum 134 is connected with exhaust pipes 136. As shown in FIG. 4, the scavenging ports 128 include a pair of scavenging ports 128a which open towards the central axis of the power cylinder 102, and six ports 128b which open along axes tangential to a phantom cylinder C coaxial with the cylinder 102. Further, all these scavenging ports 128a and 128b are inclined toward the exhaust side of the cylinder so that the flows of scavenging mixture discharged from these scavenging ports have a velocity component towards the exhaust ports 130. Thus, the flows of scavenging mixture discharged from the scavenging ports 128b and formed into swirl flows which proceed helically in the cylinder 120 towards the exhaust ports, while on the other hand the flows of scavenging mixture discharged from the scavenging ports 128a collide with each other at the center of the cylinder 102 and then proceed along the central axis of the cylinder towards its exhaust side. At a longitudinal central portion of the cylinder 102 is provided a spark plug 156.

Next, the pump 300 will be described. The pump 300 includes a pump cylinder 302 supported by the cylinder block 10. The pump cylinder 302 is surrounded by a cooling jacket 306 defined by a jacket wall 304. This cooling jacket 306 serves to remove the compression heat of mixture generated in the pump 300, so as to increase the volumetric efficiency of the pump, while further when the engine is operated in cold weather it serves to warm the pump cylinder so as to expedite atomization of the gasoline. For this purpose, the cooling jacket 306 is connected with the cooling jacket 106 of the power cylinder by a passage means not shown in the figure. In the pump cylinder 302 are provided a pair of pump pistons 308 and 310 as opposed to each other. The pistons 308 and 310 are individually connected with connecting rods 312 and 314 which in turn are individually connected with crank pins 316 and 318. The crank pins 316 and 318 are individually supported by crank arms 320 and 322. The crank mechanisms, composed of the connecting rods, crank pins, and crank arms, are individually housed in crankcases 324 and 326. These crankcases of the pump assembly are connected with the crankcases 124 and 126 so as to balance the pulsations of crankcase pressure caused by the pistons 308 and 310. Furthermore, these crankcases are connected with the internal space of an air cleaner (not shown in the figure) by a positive crankcase ventilation valve (also not shown in the figure).

The carburetor generally designated by 500 is a two stage two barrel type carburetor including a first stage barrel or carburetor 502 and a second stage barrel or carburetor 504. The first stage carburetor 502 includes a venturi portion 506, a first stage main fuel nozzle 508 which opens at the throat of the venturi portion, and a first stage throttle valve 510. Further, the second stage carburetor 504 includes a venturi portion 512, a second stage main fuel nozzle 514 which opens at the throat of the venturi portion 512, a second stage throttle valve 516, an auxiliary valve 518, and a control valve 520 provided particularly in accordance with the present invention. The detailed structures and operation of this two stage two barrel type carburetor will be explained afterwards.

The mixture outlet port of the carburetor 500 is connected with an inlet port 328 of the pump 300 by way of a passage 48. In the passage 48 or in the port 328 is provided a reed valve 330 which allows fluid to flow only toward the pump chamber. The outlet port 332 of the pump 300 is connected with the scavenging plenum 132 of the power assembly 100 by way of the passage 153. In this passage and in proximity to the scavenging plenum 132 is provided a reed valve 142 which prevents blowback of combustion gases from the cylinder 102. If there is no danger of such blowback, this reed valve may be omitted. Furthermore, the feed valve 142 serves to interrupt the reverse flow of mixture from the scavenging plenum to the pump cylinder when high vacuum is generated in the pump 300 due to its performing its suction stroke after the pump pistons have passed their top dead center (TDC). However, when the two-stroke cycle gasoline engine of the present invention is constructed so as to supply scavenging mixture by an independent scavenging pump, the TDC of which is positioned substantially behind the BDC of the power assembly 100, as proposed in the aforementioned application Ser. No. 917,241, so that the TDC of the pump is, as viewed in the crank angle diagram, in a range between 15° in advance of and 15° behind the midpoint between the bottom dead center and the scavenging port closing phase point of the power cylinder—piston assembly, the period between pump piston TDC and the exhaust port closing phase point is short, and therefore there exists positive pressure around the scavenging ports due to inertia effects even when the pump 300 has entered its suction stroke. Therefore the drawing action of the pump 300 does not substantially affect scavenging of the pump cylinder 102. Therefore, unless the aforementioned blowback of combustion gases should occur, there would exist no reverse flow which would need to be interrupted by the reed valve 142. However, when the pump TDC and power piston BDC are relatively close to each other, it is desirable that the reed valve 142 should be provided. This is due to the fact that, although the drawing action of the pump is relatively weak in such a region extending between 15° in advance of and 15° behind the TDC of the pump piston because of the small rate of movement of the piston relative to the rotational angle of the crank arms, when the crank phase proceeds beyond this phase region, the independent pump cylinder—piston assembly generates a stronger drawing action than does conventional crankcase compression.

The crankshafts 12 and 14 are drivingly connected with each other by sprocket wheels 16 and 18 individually mounted on the crankshafts and an endless chain 20 engaged around these sprocket wheels so as to co-rotate in the same direction at the same rotational speed. The phase relation between the crankshafts 12 and 14 is so determined that the crankpins 116 and 118 related with the power pistons 108 and 110 are shifted from one another by a phase difference of 180°. Depending upon this phase relation between the crankshafts 12 and 14, the crankpins 316 and 318 related to the pump pistons 308 and 310 are also shifted from each other by the same phase difference of 180°.

Figure 5:
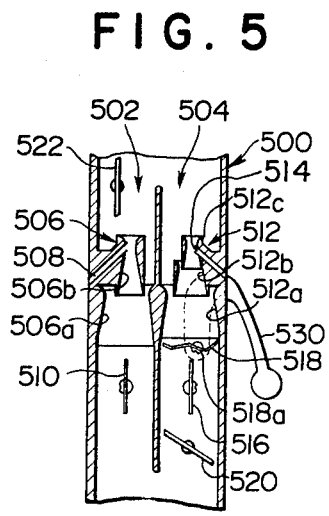
FIG. 5 is a diagrammatical longitudinal sectional view showing an embodiment of a carburetor which is incorporated in the two-stroke cycle gasoline engine of the present invention.

In FIG. 5, the carburetor 500 diagrammatically shown in FIG. 2 is shown in more detail in the form of a cross section of a more concrete embodiment. In this case the venturi portion 506 of the first stage carburetor 502 includes a large venturi 506a and a small venturi 506b. The first stage main fuel nozzle 508 opens at the throat of the small venturi 506b. In the first stage carburetor 502 and in proximity to the inlet portion of the venturi is provided a choke valve 522. The venturi portion 512 of the second stage carburetor 504 is constructed as a triple venturi which includes a large venturi 512a, a first stage small venturi 512b, and a second stage small venturi 512c.

Figure 6:
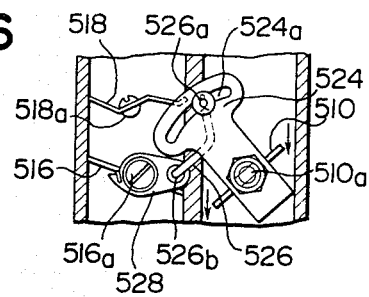
FIG. 6 is a rear side part-sectional view of a part of the carburetor shown in FIG. 5, showing a link mechanism which connects throttling valves provided in the first and second stage barrels of the carburetor.

As shown in FIG. 6, which is a partial sectional view of a part of the carburetor shown in FIG. 5 as seen from the rear side of FIG. 5, the second stage throttle valve 516 is operationally connected with the first stage throttle valve 510 by a link mechanisms which includes link elements 524, 526, 528, etc.. The link element 524 is fixed to the throttle shaft 510a of the first stage throttle valve 510 so as to rotate together with the throttle valve 510. The link element 524 has an arcuate groove 524a, in which is slidably engaged an end 526a of the link element 526. The other end 526b of the link element 526 is pivotally connected with the free end portion of the link element 528 which is fixed to the throttle shaft 516a of the second stage throttle valve 516. This link mechanism itself is well known in the art, and operates so as to open the second stage throttle valve 516 when the first stage throttle valve 510 is opened beyond a predetermined opening (normally about 45°-55°).

The auxiliary valve 518 itself is also well known in the art, and, in the embodiment shown in FIG. 5, it is flexibly maintained at its closed position by a weight 530. As the rotational speed of the engine increases so as thereby to increase intake vacuum, pressure difference which acts across the valve increases, and, when the pressure difference exceeds a predetermined value, the valve is opened against the closing force applied by the weight 530. For this purpose, as apparent from FIGS. 5 and 6, the shaft 518a of the auxiliary valve 518 is shifted from the center of the valve to one side thereof, so that a pressure difference acting across the valve produces a moment which drives the valve 518 anticlockwise as seen in FIG. 5. When this moment overcomes the moment produced by the weight 530 and acting in the reverse direction, the auxiliary valve 518 is rotated towards the valve opening direction, i.e. anticlockwise as seen in FIG. 5. In the engine of the present invention, the auxiliary valve 518 is set to open when the rotational speed of the engine exceeds about 1500 rpm.

Figure 7:
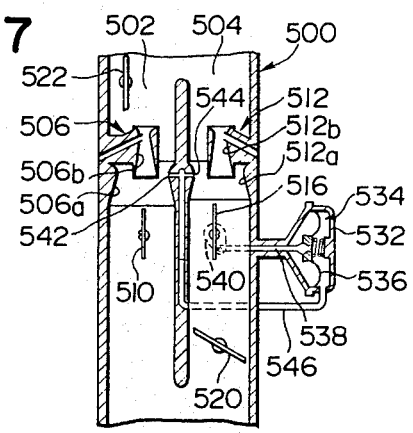
FIG. 7 is a diagrammatical longitudinal sectional view showing another embodiment of the carburetor to be incorporated in the two-stroke cycle gasoline engine of the present invention.

FIG. 7 is a view similar to FIG. 5, showing a modification of the two stage two barrel type carburetor 500. In this modification, the second stage throttle valve 516 is operated by vacuum. In more detail, the throttle valve 516 is operated by a diaphragm means 532 which has a diaphragm chamber 534, a diaphragm 536 which defines the diaphragm chamber on one side thereof, and a rod 538 connected with the diaphragm, wherein the rod 538 is connected with a free end portion of an arm 540 fixed to the shaft of the throttle valve 516. The diaphragm chamber 534 is connected with a vacuum port 542 which opens at the throat of the large venturi 506a in the first stage carburetor as well as with a vacuum port 544 which opens at the throat of the large venturi 512a of the second stage carburetor by a passage 546, so that the diaphragm chamber 534 is supplied with a vacuum which is of the mean level of the vacuums at the vacuum ports 542 and 544. Such an operating mechanism depending upon vacuum for the second barrel throttle valve itself is well known in the art.

In this case, as the first stage throttle valve 510 gradually opens from its closed position, the venturi vacuum existing in the port 542 gradually increases. However, when the second stage throttle valve 516 is closed, no substantial vacuum appears in the port 544. Therefore, the vacuum taken out from the first stage port 542 is attenuated by the air flowing in through the second stage port 544, so as to provide an attenuated vacuum to the diaphragm chamber 534 through the passage 546. When the first stage throttle valve 510 is more opened, so that the attenuated vacuum increases beyond a predetermined vacuum level, the diaphragm 536 is shifted rightwards in the figure so as to open the second stage throttle valve 516. When the second stage throttle valve 516 is opened, venturi vacuum appears in the second stage port 544, whereby the vacuum supplied to the diaphragm chamber 534 through the passage 546 rapidly increases, so that the second stage throttle valve 516 is rapidly opened thereafter. In this carburetor, in which the second stage throttle valve 516 is opened by venturi vacuum so as to be opened in accordance with air flow through the carburetor, the auxiliary valve 518 in the embodiment shown in FIGS. 5 and 6 is not required. The further portions in FIG. 7 corresponding to those shown in FIG. 5 are designated by the same reference numerals as in FIG. 5.

Figure 8:
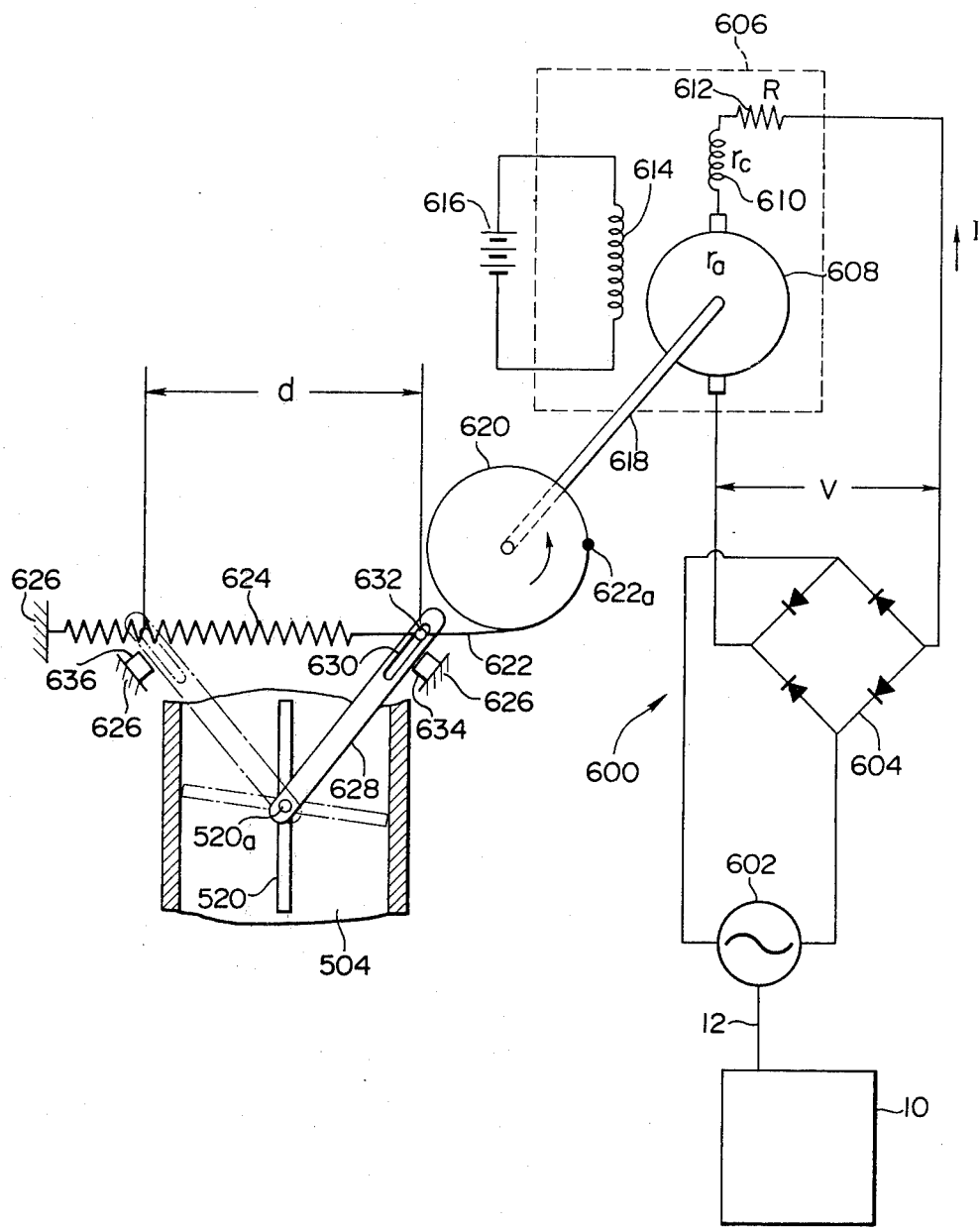
FIG. 8 is a diagrammatical view showing an embodiment of the operating mechanism for the control valve incorporated in the carburetor in the two-stroke cycle gasoline engine of the present invention.

The control valve 520 shown as incorporated in the carburetor in FIGS. 2 and 5-7 is a valve provided in accordance with the present invention so as to be more opened as the rotational speed of the engine increases. FIG. 8 is a diagrammatical view showing an embodiment of the control means for operating the control valve 520. In FIG. 8, 10 designates an engine such as shown in FIGS. 2-4, the crankshaft 12 of which, for example, drives an AC generator 602 forming a part of the controller generally designated by 600 for operating the control valve 520. The alternating current generated by the AC generator is converted by a rectifying circuit 604 to a direct current having voltage V which changes in accordance with the rotational speed of the engine. 606 designates a DC motor adapted to be driven by the DC current generated by the rectifying circuit 604. In this case, however, the armature 608 is not adapted to be continuously rotated in one direction but is adapted to generate varying torque in accordance with the voltage V of the direct current supplied to it. In the DC motor 606: 610 is a commutating pole; 612 is a magnetic field current adjusting resistance; 614 is a magnetic field coil; and 616 is a constant voltage external source for energizing the magnetic field coil. The DC motor 606 including the armature 608, the commutating pole 610, the magnetic field current adjusting resistance 612, and the magnetic field coil 614 itself is well known in the art.

The armature 608 of the DC motor 606 is connected with a pulley 620 by way of a shaft 618, which is shown in FIG. 8 in a diagrammatical perspective form, and in fact is coaxial with the armature 608 and the pulley 620. A wire 622 which is connected at its one end to an expansion coil spring 624 which is supported at its one end by a fixed housing 626 is connected at its other end 622a to a portion of the periphery of the pulley 620, whereby the pulley is exerted with a torque which drives the pulley clockwise, against which the pulley 620 is driven anticlockwise in the figure by the armature 608. The control valve 520 is adapted to be driven for opening and closing by an arm 628 which is firmly connected to its valve shaft 502a. The arm 628 has a slot 630 in its free end, in which is slidably engaged a pin 632 which is supported by the wire 622. The revolution of the arm 628 in the clockwise and anticlockwise directions as seen in the figure is limited by stops 634 and 636.

The armature current I in the DC motor 606 is given by the following formula:

$$I = (V - E)/(ra + rc + R) \quad (1)$$

wherein:
V is the input voltage,
E is the back electromotive force,
ra is the resistance of the armature 608,
rc is the resistance of the commutating pole 610, and
R is the resistance of the adjusting resistance 612.

Since the armature 608 does not move when the torque generated by the motor 606 is balanced by the force of the tension coil spring 624, at this time E equals zero. Torque T of the motor 606 is given by the following formula:

$$T = k \times M \times I \quad (2)$$

wherein:
k is a proportional constant, and
M is the magnetic flux.

Therefore, the torque of the motor 606 when the armature 608 is not moving is given by the following formula:

$$T = k \times M \times V/(ra + rc + R) \quad (3)$$

Thus, since M is constant, torque T of the motor is proportional to voltage V, and therefore is proportional to the rotational speed of the engine. When the arm 628 is in abutting contact with the stop 636, the control valve 520 is fully closed, while the expansion coil spring 624 is so mounted that in this condition it is just not extended. When the arm 628 is turned clockwise in the figure from this position, the distance of movement of the pin 632, i.e. the distance for which the expansion coil spring 624 is expanded, is proportional to the torque T of the motor 606 at that moment, by Hooke's law. When the arm 628 abuts against the stop 634, the control valve 520 is fully opened. The rotational angle of the control valve 520 between its fully closed position where the arm 628 is in contact with the stop 636 and its fully opened position where the arm 628 is in contact with the stop 634 is about 80°. When the relative arrangement between the control valve 520 and the expansion coil spring 624 is so determined that the bisector of the full rotational angle of the arm 628 crosses the expansion coil spring approximately at a right angle, the shifting of the pin 632 in the aforementioned manner is approximately proportional to the opening of the control valve 520. By this arrangement, therefore, the opening of the control valve 520 becomes approximately proportional to the rotational speed of the engine.

Figure 1:
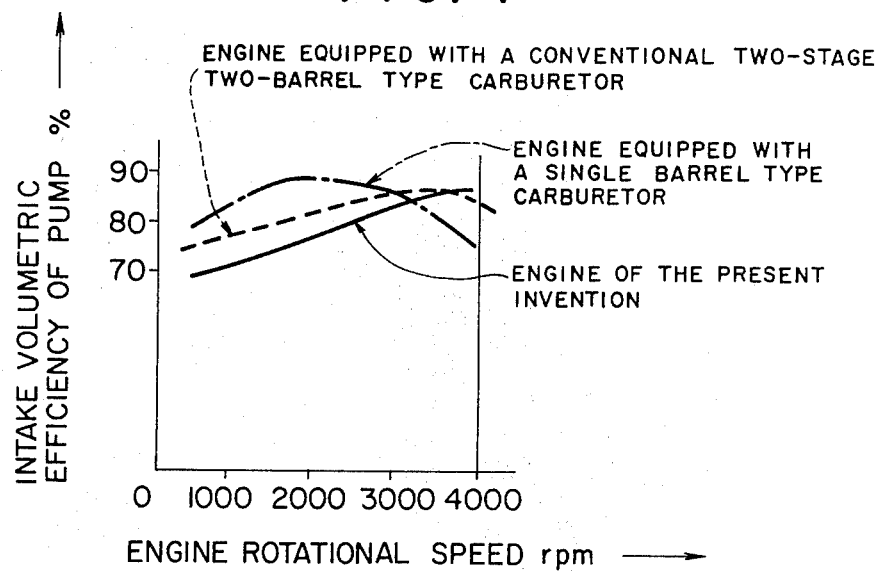
FIG. 1 is a diagram which shows changes of the intake volumetric efficiency of a scavenging pump relative to changes of the rotational speed of the engine which drives the scavenging pump, available from the present invention and from conventional engines equipped with conventional carburetors.

Therefore, when the arrangement is so determined that, for example, the pin 632 is shifted as much as the maximum distance d at an engine rotational speed of 3500 rpm, so as fully to open the control valve 520, the opening of the control valve at engine rotational speed lower than 3500 rpm becomes approximately proportional to engine rotational speed. By the opening of the control valve 520 incorporated in the second stage carburetor 504 being set so as to be approximately proportional to engine rotational speed, the intake volumetric efficiency of a scavenging pump such as the pump cylinder—piston assembly 300 in the embodiment shown in FIGS. 2-4, if it is so adjusted that its intake volumetric efficiency is the maximum at an engine rotational speed of 3500 rpm, lowers more rapidly than in the case of employing a conventional two stage two barrel type carburetor having no control valve 520, as engine rotational speed lowers from 3500 rpm, as shown in FIG. 1, whereby the delivery amount of scavenging mixture per one stroke of the power piston assembly is much reduced as engine rotational speed lowers, so that matching condition of the engine for scavenging in low to medium speed operation is maintained in the most desirable condition, as in high speed operation of the engine.

Figure 9:
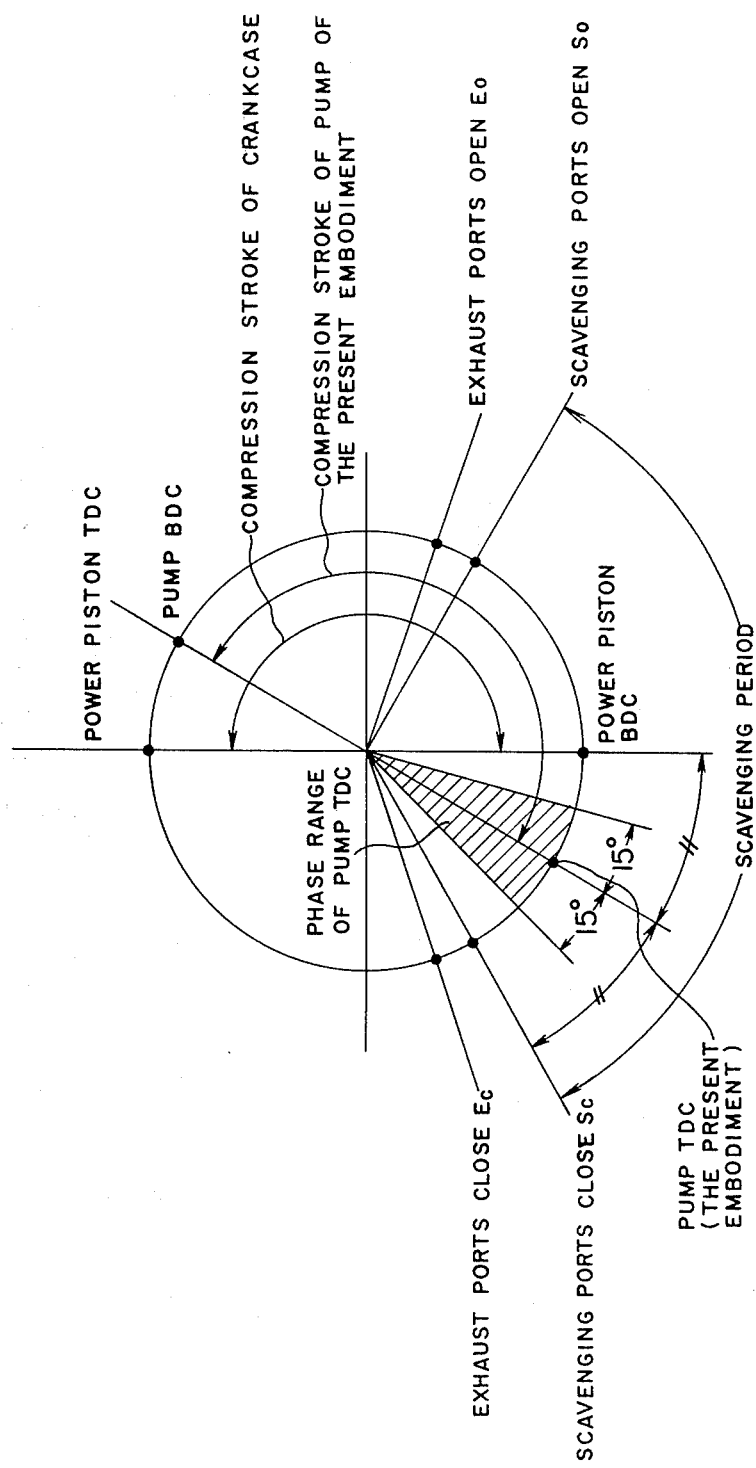
FIG. 9 is a crank angle diagram showing the operational phases of the engine shown in FIGS. 2-4.

FIG. 9 is a crank angle diagram showing the operational phases of the engine shown in FIGS. 2-4. The operation of this engine is, with regard to its operational phases, similar to that of the engine proposed in the aforementioned prior application Ser. No. 917,241. That is, in this engine, the phase relation between the power cylinder—piston assembly and the pump cylinder—piston assembly is so determined, as viewed in the crank angle diagram, that the TDC of the pump cylinder—piston assembly is in a range between 15° in advance of and 15° behind the midpoint between the BDC and the scavenging port closing phase point of the power cylinder—piston assembly which receives supply of fuel-air mixture from the pump cylinder—piston assembly. Particularly, in the embodiment whose performance is shown in FIG. 9, the TDC of the pump cylinder—piston assembly is set exactly at said midpoint. In this connection, in the engine shown in FIGS. 2–4, as in the engine proposed in the aforementioned prior patent application Ser. No. 917,241, the total stroke volume of the pump cylinder—piston assembly 300 is determined to be 1.15–1.65 times as large as that of the power cylinder—piston assembly 100.

Figure 10:
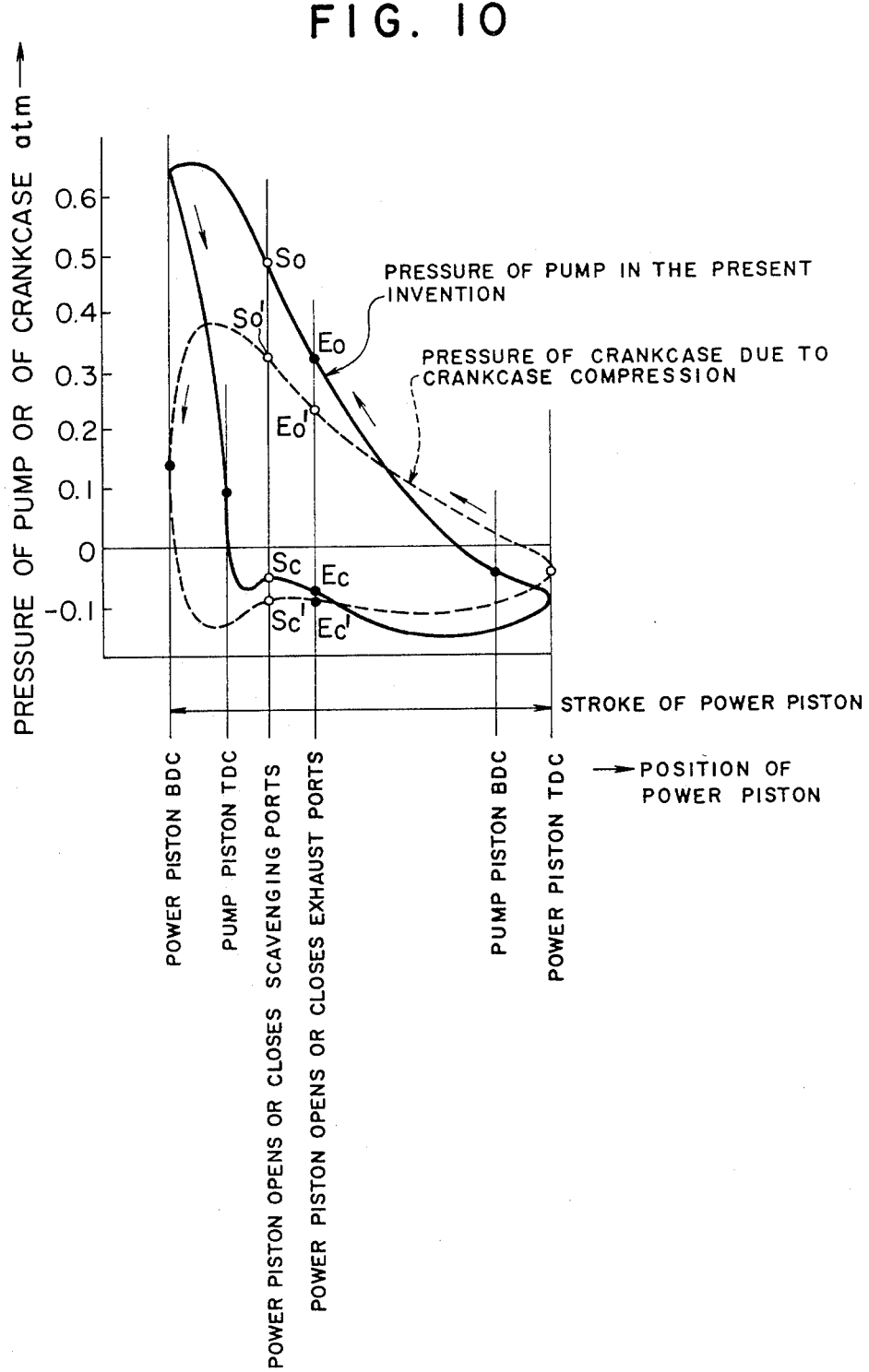
FIG. 10 is an indicator diagram showing changes of the pump pressure relative to the position of the power piston in the engine shown in FIGS. 2-4, also showing, for the purpose of comparison, the same relation in an engine incorporating conventional crankcase compression.

FIG. 10 is an indicator diagram showing changes of the pump pressure relative to the position of the power piston in the engine shown in FIGS. 2–4. In this figure, for the purpose of comparison, the crankcase pressure due to conventional crankcase compression is also shown.

The operation of the engine shown in FIGS. 2–4 will now be explained, with reference to FIGS. 9 and 10. When the pump pistons 308 and 310 move from their TDC towards their BDC, the reed valve 330 opens and fuel-air mixture is drawn into the pump cylinder 302 from the carburetor 500. When the power pistons 108 and 110 have moved 30° from their TDC, the pump pistons traverses their BDC and enter into their compression stroke, and the reed valve 330 is closed. When the compression stroke of the pump has proceeded so far that its delivery pressure overcomes the spring force of the reed valve 142, the reed valve is opened, and scavenging mixture is charged into the scavenging plenum 132. Then, first the exhaust ports 130 are opened, so as to discharge exhaust gases through the exhaust plenum 134 and the exhaust pipes 136. When the pressure of the exhaust gases remaining in the power cylinder has substantially lowered, the scavenging ports 128 are uncovered by the piston 108, whereupon scavenging mixture is ejected into the power cylinder. At this time the scavenging pressure is at the level of So in FIG. 10, while the scavenging pressure is changing in accordance with change of the pump pressure as shown in FIG. 10.

However, the actual scavenging pressure is affected by various factors. For example, if the reed valve 142 is almost closed after the scavenging plenum 132 has been filled with scavenging mixture, after the initiation of discharge of scavenging mixture from the scavenging ports 128, the scavenging pressure slightly lowers for a moment because it takes a time for the reed valve 142 to be again opened. However, when the engine is operating at such a high rotational speed that the scavenging ports 128 are opened immediately after the scavenging plenum 132 has been filled with scavenging mixture, the reed valve 142 is maintained in its open condition, and therefore no temporary lowering of the scavenging pressure occurs. Although the pump pistons reach their TDC at a phase point which is 30° in advance of the end of the scavenging period, since the pump pistons do not move much in a phase region such as 15° by crank angle behind their TDC, thereby generating only a small pressure, if the stroke volume of the pump is large so as to deliver a large amount of scavenging mixture, the flow of scavenging mixture into the power cylinder 102 is maintained over a substantial phase region after the pump TDC by the inertia effect of mass flow, thereby increasing volumetric efficiency of the power cylinder.

The speed of the mixture flow in the passage extending from the pump outlet port 332 to the scavenging ports 128 and that of the mixture flow through the scavenging ports 128 are determined by the delivery pressure and the delivery amount of the pump, and are not directly related with the rotational speed of the engine. On the other hand, the time lapse between pump TDC and the scavenging port closing phase point Sc varies in accordance with engine rotational speed, so that it becomes shorter as engine rotational speed increases. In this connection, since in the present invention the intake volumetric efficiency of the pump is changed as shown in FIG. 1 in accordance with rotational speed of the engine, so that the speed of the mixture flow from the pump delivery port 332 to the scavenging ports 128 and the speed of scavenging mixture discharged through the scavenging ports 128 are changed in accordance with engine rotational speed, if the adjustment of these is properly done, the flowing in of scavenging mixture into the power cylinder 102 is maintained over the entire scavenging period over a wide range of engine rotational speed without causing blow-out of scavenging mixture to the exhaust plenum.

Here it is to be noted that, although in the embodiments shown in FIGS. 2 and 5–7 the control valve 520 is incorporated in the second stage barrel, which is shut down in low load operation of the engine, in this low load region the intake volumetric efficiency of the pump automatically decreases without the control valve, as the rotational speed of the engine lowers.

When the pistons 108 and 110 further move, the scavenging ports 128 are closed by the piston 108, and then the exhaust ports 130 are closed by the piston 110 (Ec), whereupon the engine enters into compression stroke, so that mixture is compressed, and the compressed mixture is ignited by the spark plug 156 at a phase point which is somewhat in advance of power piston TDC, wherefrom the power cylinder enters into combustion stroke.

Figure 11:
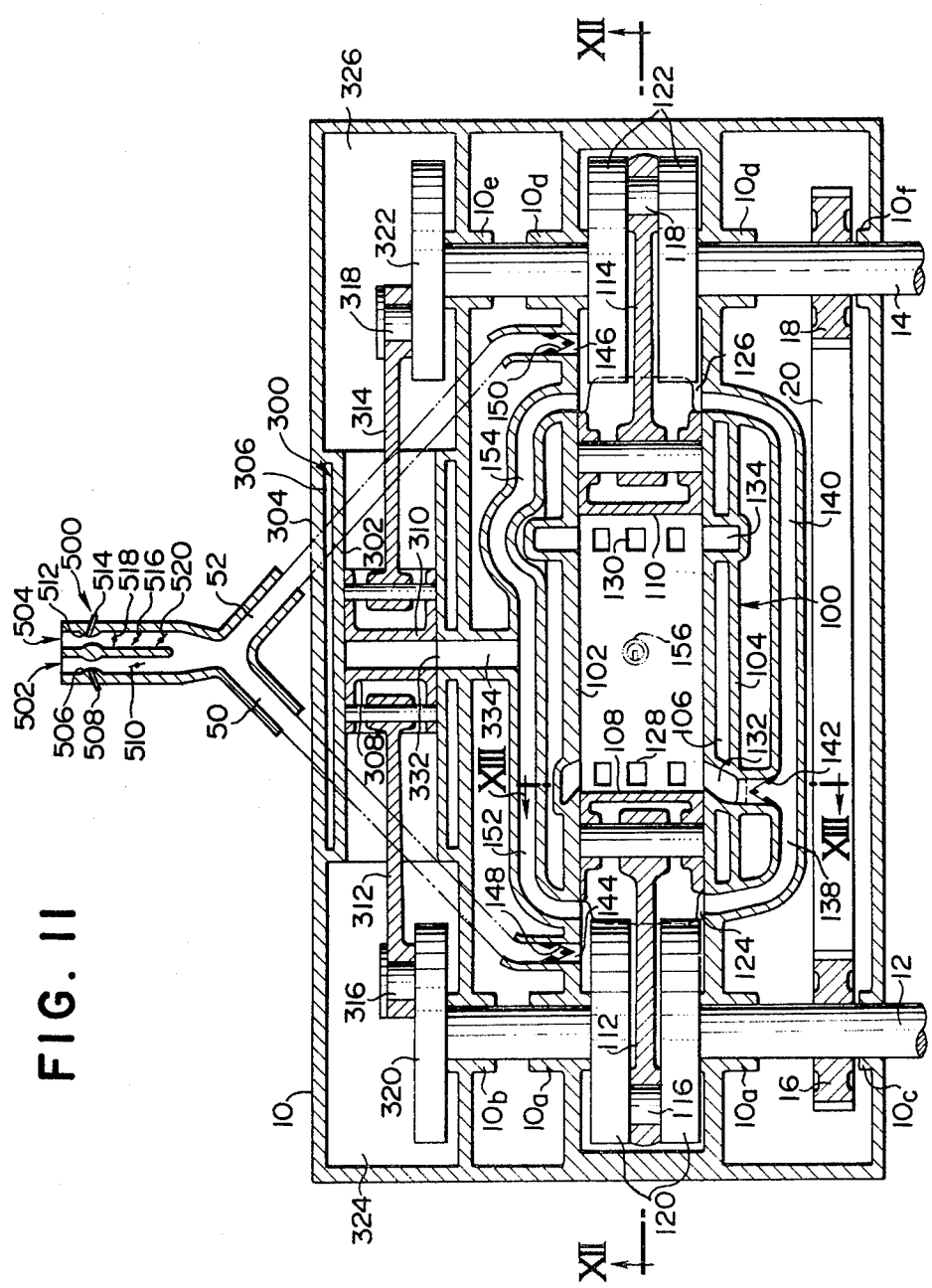
FIG. 11 is a diagrammatical plan sectional view showing a second embodiment of the two-stroke cycle gasoline engine of the present invention.
Figure 12:
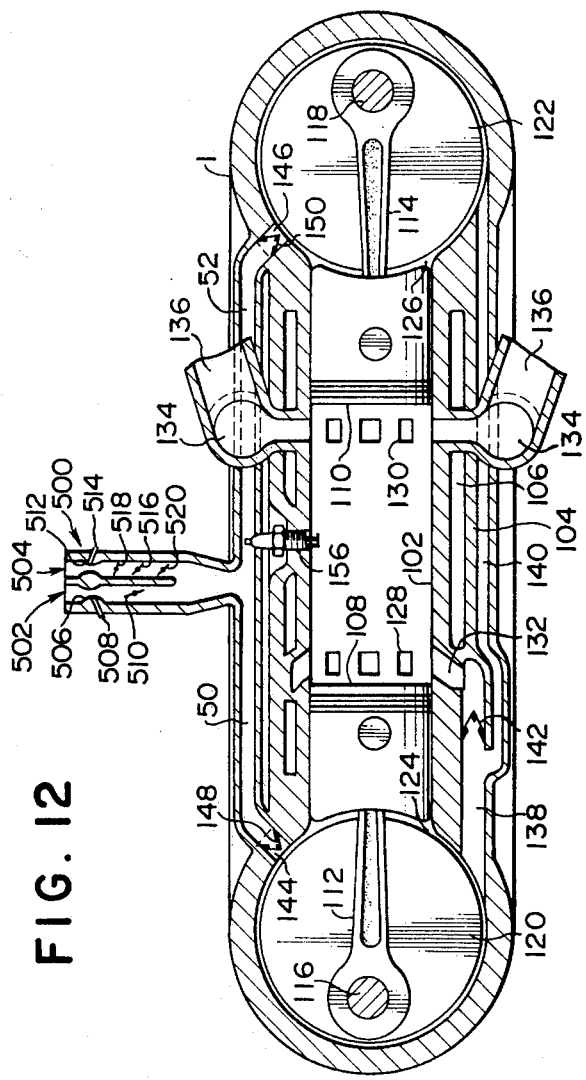
FIGS. 12 and 13 are sectional views along lines XII—XII and XIII—XIII in FIG. 11.
Figure 13:
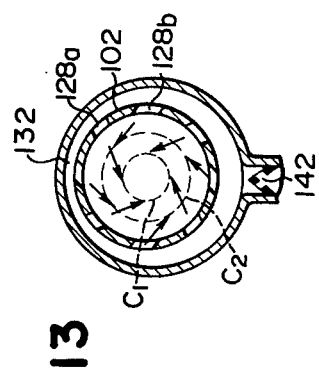

FIG. 11 is a diagrammatical plan sectional view showing a second embodiment of the two-stroke cycle gasoline engine of the present invention, and FIGS. 12 and 13 are sectional views along lines XII'XII and XIII-—XIII in FIG. 11. In these figures, the portions corresponding to those shown in FIGS. 2–4 are designated by the same reference numerals as in FIGS. 2–4. This second embodiment employs crankcase compression in addition to a supplementary scavenging pump for compressing scavenging mixture. In this embodiment the crank arms 120 and 122 of the power assembly 100 are disk-shaped, and crank assemblies, each composed of a pair of these crank arms and a crank pin connecting the pair of crank arms, are received in the crankcases 124 and 126, respectively, so that a substantial part of the space in each crankcase is occupied by the crank assembly, regardless of the rotational angle of the crank arms, so as to minimize the clearance volume of the crankcase and to increase the effectiveness of the crankcase compression. In this embodiment the outlet of the carburetor 500 is connected with the crankcases 124 and 126 of the power assembly 100 by way of passages 50 and 52, so that the mixture generated by the carburetor 500 is directly supplied to the crankcases 124 and 126. In ports 144 and 146 at which the passages 50 and 52 open to the crankcases 124 and 126, respectively, are provided reed valves 148 and 150, respectively, so as to prevent reverse flow of scavenging mixture. The crankcases 124 and 126 are connected with an outlet port 332 of the supplementary scavenging pump 300 by way of passages 152 and 154 respectively and a common passage 334, on the one hand, while on the other hand the crankcases 124 and 126 are connected with the scavenging plenum 132 by way of passages 138 and 140 respectively.

Also in this embodiment the carburetor 500 is constructed as a two stage two barrel type carburetor having a first stage barrel or carburetor 502, and a second stage barrel or carburetor 504 which further includes a control valve 520 adapted to be controlled in accordance with the rotational speed of the engine, as in the embodiment shown in FIGS. 2-4. Further, the total stroke volume of the scavenging pump means including the crankcases 124 and 126 and the pump 300 is determined to be 1.35-1.85 times as large as that of the power cylinder—piston assembly, as in the engine proposed by the aforementioned prior patent application Ser. No. 917,244. Therefore, the total stroke volume of the pump 300 in this embodiment is to be 0.35-0.85 times as large as that of the power cylinder—piston assembly 100.

In this second embodiment, which employs crankcases and a supplementary scavenging pump for the compression of scavenging mixture, in the suction stroke the crankcases 124 and 126 take in mixture through the passages 50 and 52 and a carburetor 500, while the pump 300 which operates in roughly the same phase as the crankcases 124 and 126 takes in mixture from the crankcases 124 and 126 through the passages 152, 154, and 334, and therefore, as a whole, further through the passages 50 and 52 and the carburetor 500. When the crankcases 124 and 126 and the pump 300 begin to perform their compression strokes, he mixture in the crankcases 124 and 126 is compressed in these crankcases while remaining therein, while on the other hand the mixture drawn into the pump cylinder 302 is again pushed back to the crankcases 124 and 126 through the passages 334, 152, and 154 as it is compressed between the pump pistons 308 and 310. The mixture thus compressed in either of the two crankcases or in both the pump cylinder and either of the two crankcases is supplied towards the scavenging plenum 132 through the passage 138 or 140.

Figure 14:
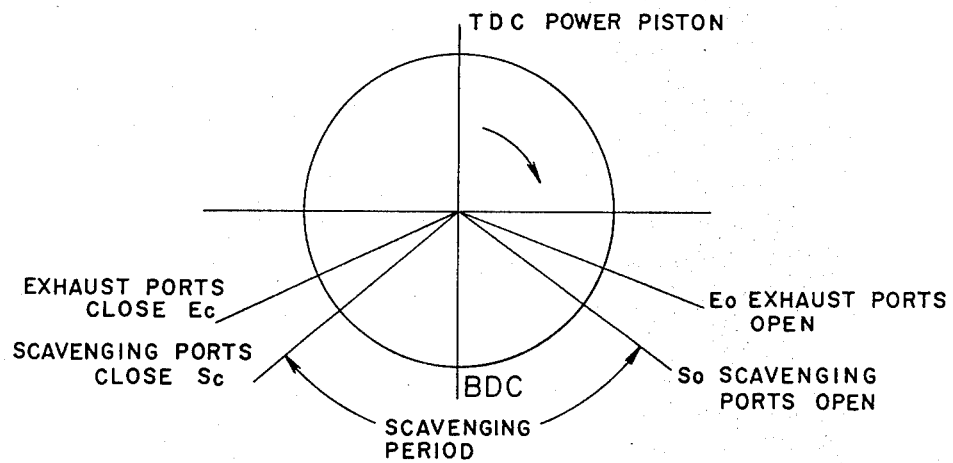
FIG. 14 is a crank angle diagram showing the operational phases of the engine shown in FIGS. 11 and 13.
Figure 15:
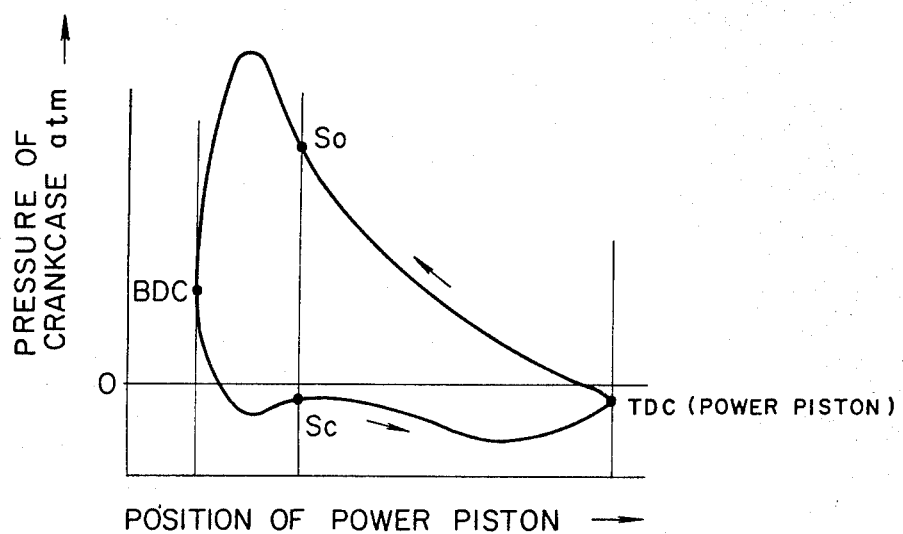
FIG. 15 is an indicator diagram showing changes of the crankcase pressure relative to the position of the power piston in the engine shown in FIGS. 11-13.

FIG. 14 is a crank angle diagram showing the opening and closing phases of the scavenging and exhaust ports in the engine shown in FIGS. 11-13. FIG. 15 is an indicator diagram showing changes of the crankcase pressure relative to the position of the power piston in the engine shown in FIGS. 11-13, in full throttle operation of the engine. Since the crankcase pressure abruptly lowers when the power pistons traverse their BDC, as shown in FIG. 15, in this case it is also desirable that the operational phase angle of the pump pistons should be further delayed relative to that of the power pistons by an angle not larger than 15°, so that the operational phase of the pump pistons should be delayed relative to the power pistons by an angle of 180°-195°, as proposed in the aforementioned former patent application Ser. No. 917,244, whereby scavenging in the last scavenging period after power piston BDC is further improved.

The valve 520 in this embodiment functions in the same way as in the first embodiment, and the same advantages accrue therefrom.

FIG. 16 is a diagrammatical plan sectional view showing a third embodiment of the two-stroke cycle gasoline engine of the present invention, which resembles the second embodiment shown in FIGS. 11-13. In FIG. 16, the portions corresponding to those shown in FIGS. 2-4 and 11-13 are designated by the same reference numerals as in these figures. The sections along lines XII—XII and XIII—XIII are the same as FIGS. 12 and 13. In this third embodiment, the mixture outlet port of the carburetor 500 is connected with the inlet port 328 of the pump 300 by way of the passage 48 as well as with the ports 44 and 146 opening towards the crankcases 124 and 126 of the power cylinder—piston assembly 100 by way of passages 50 and 52, respectively. In the passage 48 and in proximity to the port 328 is provided the reed valve 330 which allows mixture to flow only towards the port 328. In this embodiment, a part of the fuel-air mixture generated in the carburetor 500 is directly supplied to the crankcases 124 and 126 of the power cylinder—piston assembly 100 so as to be compressed in the crankcases, while the other part of the fuel-air mixture is supplied to the pump 300, and after having been compressed in the pump is supplied to the crankcases 124 and 126 by way of the passages 344, 152 and 154, so that the fuel-air mixture generated by the carburetor is as a whole compressed by the crankcases 124 and 126, thereby increasing the pressure and the amount of scavenging mixture supplied to the power cylinder 102. Also in this case, as in the second embodiment, it is desirable that the total stroke volume of the scavenging pump means composed of the crankcases 124 and 126 and the pump 300 should be 1.35-1.85 times as large as that of the power cylinder 100; that is, the total stroke volume of the pump 300 should be 0.35-0.85 times as large as that of the power cylinder 100. Comparing this third embodiment with the second embodiment shown in FIGS. 11-13, the third embodiment has an advantage that it draws in fuel-air mixture through a relatively short passage such as 48 in its intake stroke, while the second embodiment must draw fuel-air mixture through a relatively long passage including the passages 50 and 52, the crankcases 124 and 126, and the passages 152, 154, and 334, which provides a relatively large flow resistance. On the other hand, however, in the delivery stroke of the pump 300 the third embodiment must supply fuel-air mixture through the reed valve 336 which causes a pressure loss of the scavenging mixture, while the second embodiment which has no such reed valve is free from such pressure loss. Further, a reed valve, in its actual structure, occupies a relatively large space, and therefore, if the reed alve 336 is provided in the passage 334, the passage cannot be so short as diagrammatically shown in FIG. 16. Therefore, the clearance volume involved in the passage 334 will be considerably different with respect to the two embodiments shown in FIGS. 11 and 16—i.e. of course the clearance volume will be substantially smaller in the engine shown in FIG. 11. Further, with respect to the pipe arrangement at the outlet of the carburetor the second embodiment has an advantage over the third embodiment in that it is more simple. However, regardless of these advantages and disadvantages, the second embodiment, shown in FIGS. 11-13 and the third embodiment shown in FIG. 16 have substantially the same performance.

The valve 520 in this embodiment, agan, functions in the same way as in the first embodiment, and the same advantages accrue therefrom.

Although the invention has been shown and described with respect to some preferred embodiments thereof, it should be understood that various changes and omissions of the form and the detail thereof may be made therein by one skilled in the art without departing from the scope of the invention.

We claim:
1. A two-stroke cycle gasoline engine comprising at least one two-stroke cycle power cylinder—piston assembly having two horizontally opposed pistons and incorporating uniflow scavenging, a reciprocating type scavenging pump means including at least one pump cylinder—piston assembly of the reciprocating type driven by said power cylinder—piston assembly in synchronization therewith, and a carburetor incorporating a throttle valve and a control valve which is controlled to increase its opening as the rotational speed of the engine increases.

2. The engine of claim 1, wherein said carburetor is a two stage two barrel type carburetor which includes first and second stage barrels containing respectively first and second throttle valves which are opened and closed in two stages, said control valve being incorporated in said second stage barrel in series with said second throttle valve.

3. The engine of claim 1 or 2, comprising an electrical drive means for operating said control valve, which includes an AC generator driven by the output shaft of the engine, a rectifying circuit which rectifies the alternating current generated by said generator, and a torque generating means which is energized by the direct current obtained by said rectifying circuit from said alternating current.

4. The engine of claim 1, wherein the total stroke volume of said pump cylinder—piston assembly is between 1.15 and 1.65 times as large as that of said power cylinder—piston assembly, and the phase difference between said power and pump cylinder—piston assemblies is so determined that the top dead center of a pump cylinder—piston assembly is, as viewed in the crank angle diagram, in a range between 15° in advance of and 15° behind the midpoint between the bottom dead center and the scavenging port closing phase point of the power cylinder—piston assembly to which it supplies scavenging mixture.

5. The engine of claim 1, wherein the total stroke volume of said scavenging pump means is between 1.35 and 1.85 times as large as that of said power cylinder—piston assembly, and the operational phase of a power cylinder—piston assembly is so shifted relative to that of the power cylinder—piston assembly to which it supplies scavenging mixture that, when the power cylinder—piston assembly is at its bottom dead center, the pump cylinder—piston assembly is at or slightly before its top dead center.

* * * * *